US007001630B2

(12) United States Patent
Bender

(10) Patent No.: US 7,001,630 B2
(45) Date of Patent: *Feb. 21, 2006

(54) ANIMAL PROTEIN-CONTAINING FOOD PRODUCTS HAVING IMPROVED MOISTURE RETENTION AND METHOD OF PREPARING

(75) Inventor: Fredric G. Bender, Mc Murray, PA (US)

(73) Assignee: Danisco A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/639,821

(22) Filed: Aug. 13, 2003

(65) Prior Publication Data

US 2004/0062851 A1 Apr. 1, 2004

Related U.S. Application Data

(60) Provisional application No. 60/430,552, filed on Aug. 14, 2002.

(51) Int. Cl.
*A23L 1/314* (2006.01)
*A23L 1/318* (2006.01)

(52) U.S. Cl. ...................... 426/281; 426/641; 426/646; 426/657

(58) Field of Classification Search ................ 426/281, 426/641, 646, 657
See application file for complete search history.

(56) References Cited

U.S. PATENT DOCUMENTS

| | | | | |
|---|---|---|---|---|
| 3,622,347 A | | 11/1971 | Aepli | |
| 4,031,267 A | * | 6/1977 | Berry et al. | 426/656 |
| 4,592,892 A | | 6/1986 | Ueno et al. | 422/28 |
| 5,283,073 A | | 2/1994 | Bender et al. | 426/332 |
| 5,431,937 A | * | 7/1995 | Kandl et al. | 426/281 |
| 5,512,309 A | | 4/1996 | Bender et al. | 426/332 |
| 5,891,499 A | | 4/1999 | Balsano | 426/335 |

FOREIGN PATENT DOCUMENTS

WO WO 03/003842 A1 1/2003

OTHER PUBLICATIONS

European Patent Office, Patent Abstract of Japan, Publication No. 2000245419, Publication Date Dec. 9, 2000, Functional Alkaline Earth Ionized Food Additive Composition, Its Production and Using Method.

* cited by examiner

*Primary Examiner*—Arthur L. Corbin
(74) *Attorney, Agent, or Firm*—Fay, Sharpe, Fagan, Minnich & McKee, LLP

(57) ABSTRACT

An animal protein-containing food product contains animal protein, water and an amount of an alkali silicate effective to enhance the moisture retention of the muscle food product. A method for treating an animal protein-containing food product to improve the moisture retention of the food product includes the step of contacting the muscle food product or food product ingredient with an alkali silicate.

49 Claims, No Drawings

ANIMAL PROTEIN-CONTAINING FOOD PRODUCTS HAVING IMPROVED MOISTURE RETENTION AND METHOD OF PREPARING

This application claims benefit of 60/430,552, filed Aug. 14, 2002.

FIELD OF THE INVENTION

This invention relates to animal protein-containing food products, more specifically to animal protein-containing food products having improved moisture retention.

BACKGROUND OF THE INVENTION

Animal protein-containing food products, such as poultry, ham, roast beef, frozen fish filets, shrimp, scallops and fine paste sausages, contain moisture in the form of natural water content and, in some cases, water that is added during processing. The water content of such products has a pronounced effect on both product weight and product sensory qualities. Various additives, such as, for example, polyphosphates, starches, gums, and carrageenans, are used as to enhance the moisture retention of such food products. Polyphosphates are the most commonly used moisture retention additive, but may undesirably increase the phosphorus content of food processing effluents.

SUMMARY OF THE INVENTION

In a first aspect, the present invention is directed to an animal protein-containing food product, comprising animal protein, water and an amount of alkali silicate effective to enhance the moisture retention of the food product.

In second aspect, the present invention is directed to a method for treating an animal protein-containing food product to improve the moisture retention of the food product, comprising contacting the food product or an ingredient of the food product with an alkali silicate.

DETAILED DESCRIPTION OF INVENTION AND PREFERRED EMBODIMENTS

As used herein, the terminology "animal protein-containing food product" means any food product that contains animal protein, including, but not limited to, meat. Animal protein-containing food products may include poultry, ham, roast beef, sheep, goat, beef, pork, game, fish, shrimp and scallops, and sausages, including fine paste sausages, such as hot dogs. In one embodiment, the animal protein is preferably derived from animal muscle tissue. In one embodiment, the animal protein-containing food product contains from about 1 to about 30 percent by weight ("% w/w") animal protein, based on the dry weight of such protein.

An amount of alkali silicate that is "effective to enhance moisture retention" means an amount of alkali silicate that provides improved moisture retention in an animal protein-containing food product, as measured by, for example, initial moisture pickup (typically appropriate for evaluating raw foods, such as chicken breasts), cook yield (typically appropriate for evaluating cooked foods, such as ham), cooking loss, and purge measurements (typically appropriate for evaluating packaged foods, such as hot dogs), as compared to a directly analogous animal protein-containing food product without the alkali silicate.

In one embodiment, the animal protein-containing food product comprises, based on about 100% w/w of the food product, from about 1% w/w to about 30% w/w muscle protein, from about 30% w/w to about 80% w/w water, up to about 50% w/w fat and from about 0.005% w/w to about 1.0% w/w alkali silicate, and more preferably from about 0.1% w/w to about 1.0% w/w alkali silicate, and most preferably about 0.2% w/w concentration alkali silicate.

Compounds suitable as the alkali silicate component of the present invention are crystalline or amorphous alkali silicate compounds according to formula:

$$M_2O.m(SiO_2).nH_2O$$

wherein:

M is sodium or potassium, m is a number, wherein $0.5 \leqq m \leqq 4$, indicating the number of mole(s) of the $SiO_2$ moiety per 1 mole of $M_2O$ moiety; and n indicates the water content, expressed as wt % water, wherein $0\% \leqq n \leqq 55\%$.

Suitable alkali silicates include, for example, sodium disilicates, potassium disilicates, potassium metasilicates, and preferably sodium metasilicates. The alkali silicates may be in anhydrous or hydrated form. Mixtures of two or more alkali silicates are also suitable as the alkali silicate component of the present invention.

The alkali silicate preferably comprises one or more metasilicates, which are crystalline products, according to $M_2O.(SiO_2).n'H_2O$, wherein M is sodium (Na) or potassium (K) and n' is 0, 5, 6 or 9 and indicates the number of moles of water per $SiO_2$ moiety. The alkali silicate preferably comprises one or more of anhydrous sodium metasilicate, anhydrous potassium metasilicate, sodium metasilicate pentahydrate, sodium metasilicate hexahydrate and sodium metasilicate nonahydrate. More preferably, the alkali silicate comprises one or more of anhydrous sodium metasilicate, anhydrous potassium metasilicate and sodium metasilicate pentahydrate. Even more preferably, the alkali silicate comprises one or more of anhydrous sodium metasilicate and anhydrous potassium metasilicate, and one or more of sodium metasilicate pentahydrate and potassium metasilicate pentahydrate. Most preferably, the alkali silicate comprises sodium metasilicate. Preferred sodium metasilicate ratios are 3.5, e.g., m=3.5; 2, e.g., m=2; and more preferably 1, e.g., m=1.

Any suitable amount of alkali silicate effective to enhance moisture retention may be used. In a preferred embodiment, the alkali silicate component is present in an amount sufficient to provide greater than or equal to about 0.005% w/w alkali silicate, more preferably from greater than about 0.1% w/w, and still more preferably from about 0.2% w/w to about 1% w/w alkali silicate concentration in the animal protein containing food product. Either the anhydrous form or a hydrated form of the alkali silicate may be used to form the treatment solution, provided that the appropriate adjustment is made to compensate for the weight of any associated water of hydration. Unless otherwise specified, the concentrations of alkali silicates given herein are based on the weight of anhydrous alkali silicate. No matter which process is used, an amount of alkali silicate effective to provide an animal protein-containing food product having (based on about 100% w/w of the food product) from about 1% w/w to about 30% w/w muscle protein, from about 30% w/w to about 80% w/w water, up to about 50% w/w fat, and from about 0.005% w/w to about 1.0% w/w alkali silicate, should be used.

The animal protein-containing food product may optionally, contain other ingredients, such as for example, cereal products, milk proteins, sweeteners, soy proteins, vegetable proteins, and salts. Other moisture retention additives, such as for example, polyphosphates, starches, gums, emulsifiers, or carrageenans, may be used in addition to the alkali silicate.

In one embodiment, one or more ingredients, comprising, for example, ground meat, of the animal protein-containing food product are contacted with the alkali silicate, in its dry form, e.g. in the form of a particulate alkali silicate solid. For example, the food product ingredient may be treated by mixing the ingredient with dry alkali silicate in solid particulate form. The alkali silicate treated ingredient may then be incorporated into the food product. Preferred amounts of alkali silicate solid are greater than about 0.05% w/w, more preferably about greater than about 0.1% w/w, and most preferably from about 0.2% w/w to about 1% w/w alkali silicate concentration in the animal protein-containing food product.

In another embodiment, the animal protein-containing food product is contacted with the alkali silicate by contacting alkali silicate, in the form an aqueous alkali silicate solution, with the food product. For example, the food product may be contacted with an aqueous solution of the alkali silicate by tumbling, dipping, immersion, injection, massage marinating, or by any other suitable means.

Suitable aqueous alkali silicate solutions are made by dissolving the components of the solution in water. In one embodiment, the aqueous alkali silicate solution consists essentially of a solution of alkali silicate in water. In another embodiment, the aqueous alkali silicate solution consists of a solution of alkali silicate in water. As used herein, the term "water" generally refers to tap water, that is, water as available onsite without requiring purification that may contain minor amounts of components other than $H_2O$. However, any suitable water may be used.

In a preferred embodiment, the aqueous treatment solution is such that it provides greater than or equal to about 0.005% w/w alkali silicate concentration, more preferably about greater than about 0.1% w/w, and most preferably from about 0.2% w/w to about 1% w/w alkali silicate concentration in the animal protein-containing food product. Accordingly, a preferred aqueous treatment solution comprises greater than or equal to about 0.05 percent by weight (wt %) of the solution alkali silicate, more preferably from about 0.1 wt %, still more preferably from about 0.2 wt % to about 15 wt %, and even more preferably from about 0.47 wt % to about 6 wt %, alkali silicate, wherein the ranges are calculated on the basis of the weight of the anhydrous alkali silicate.

For example preferred solutions may comprise the following:

- about 1.53 wt % SMS, about 5.75 wt % salt, and about 92.72 wt % water to provide a 0.2% w/w concentration of SMS in the food product;
- about 2.68 wt % SMS, about 5.75 wt % salt, and about 91.57 wt % water to provide 0.35% w/w concentration of SMS in the food product; and
- about 3.83 wt % SMS, about 5.75 wt % salt, and about 90.42 wt % water to provide 0.5% w/w concentration of SMS in the food product.

The aqueous alkali silicate solution may, optionally, further comprise other components, such as for example, alkali metal salts, such as for example, NaCl, KCl, and surfactants suitable for food use.

In a preferred embodiment, the aqueous solution exhibits a pH of from about 10 to about 14, more preferably from about 11 to about 13.5, even more preferably from about 11.4 to about 13.

Also, in a preferred embodiment, the aqueous alkali silicate solution is at a temperature of from about 0 to about 85° C., more preferably from 0 to about 70° C., still more preferably from about 0° C. to about 50° C., and even more preferably from about 0° C. to about 20° C.

The food product should be contacted with the alkali silicate solution for a period of time sufficient to saturate the food product with solution or absorb the solution into the food product. For example, at atmospheric pressure in a dip tank, dwell times from about 5 seconds to about 30 minutes are effective, with a dipping time of about 1 minute or less being preferred. Also, for example, dwell times using tumbling may range from about 30 seconds to several hours. A dwell time of about 1 hour to about 4 hours is preferred at 12 rpm continuously.

Food products that have been treated according to the present invention can, immediately after such treatment, be processed according to normal food processing conditions, such as chilling, freezing, or cooking.

It should also be appreciated that the compositions of the solutions and methods used in the process of the invention may be varied according to the desired characteristics of the food product. The following non-limiting examples will further illustrate the preparation and performance of the invention. However, it is to be understood that these examples are given by way of illustration only and are not a limitation of the invention.

EXAMPLES

Example I

Turkey breast meat was ground using a ⅜ inch plate. The pH of the raw meat was then measured. Next, aqueous treatment solutions were prepared of one of the following components: anhydrous sodium metasilicate (SMS) having a ratio of 1 (e.g., wherein m is 1 and M is sodium), sodium hydroxide (NaOH), or Sodium Carbonate ($Na_2CO_3$). The treatment solutions were prepared using salt, water and one of the above listed components to yield concentrations of 0.2, 0.4, 0.6, and 0.8% w/w of the component in the treated meat. Control 1 was prepared using a treatment solution of water and salt, only, i.e. no additional active ingredients such as phosphate, hydroxide, carbonate, or alkali silicates. Controls 2 and 3 were prepared using dextrose as a filler, water, and salt. However, no additional active ingredients were used in Controls 2 or 3 either. The concentration of dextrose was at 0.3% w/w and 0.7% w/w respectively. Table 1A below shows the recipe for the various treatment solutions.

The meat was placed in a mixer, and then half of the treatment solution was added and mixed for about 30 seconds at speed 1. The bowl was scraped, then the remaining treatment solution was added while mixing for four (4) minutes at speed 1. About one minute prior to the end of the mixing process, the mixer was stopped and the bowl was scraped. The pH of the treated ground meat was measured. The meat paste was then placed in aluminum cups or loaf pans. The weight was standardized at 400 grams per cup. The cups were each sealed with a plastic foil and the meat was cooked in a baking oven, until the core temperature reached 72.2° C. (162° F.). The total cooking time was about 1.5 hours at 110° C. (230° F.). The cooked product was left to cool for about 1 hour at room temperature. After cooling, the meat was dried in absorbent paper then weighed.

Various measurements were taken before and after cooking. These measurements include pH of the treatment solution, pH of the meat before treatment, pH of the meat after treatment, and a final pH of the cooked treated meat (see Table 1B); weight of the meat before and after cooking and percent weight loss or cooking loss (see Table 1C); and color (see Table 1D). The color and weight measurements were taken from four different samples of each of the treated ground meat selections. Accordingly, the individual results and the averages are reported in Tables 1C and 1D below.

TABLE 1A

| | Recipe | | | | | | | | | | | | |
|---|---|---|---|---|---|---|---|---|---|---|---|---|---|
| | | | | A | | | | B | | | | C | |
| | Control 1 | Control 2 | Control 3 | A1 (0.2%) | A2 (0.4%) | A3 (0.6%) | A4 (0.8%) | B1 (0.2%) | B2 (0.4%) | B3 (0.6%) | B4 (0.8%) | C2 (0.4%) | C4 (0.8%) |
| | 0 | Dextrose .70 | Dextrose 1.63 | SMS .47 | SMS .93 | SMS 1.40 | SMS 1.87 | NaOH .47 | NaOH .93 | NaOH 1.40 | NaOH 1.87 | $Na_2CO_3$ .93 | $Na_2CO_3$ 1.87 |
| Water | 96.03 | 95.33 | 94.40 | 95.57 | 95.10 | 94.63 | 94.17 | 95.57 | 95.10 | 94.63 | 94.17 | 95.10 | 94.17 |
| Salt | 3.97 | 3.97 | 3.97 | 3.97 | 3.97 | 3.97 | 3.97 | 3.97 | 3.97 | 3.97 | 3.97 | 3.97 | 3.97 |

TABLE 1B

| pH Results | Control 1 | Control 2 | A1 | B1 | A2 | B2 | C2 | A3 | B3 | Control 3 | A4 | B4 | C4 |
|---|---|---|---|---|---|---|---|---|---|---|---|---|---|
| pH Solution | | 6.3 | 12.55 | 13.08 | 12.86 | 13.32 | 11.35 | 12.95 | 13.43 | 7.65 | 13.07 | 13.51 | 11.81 |
| pH Raw Meat | 6.21 | 6.02 | 6.02 | 6.02 | 6.02 | 6.02 | 6.02 | 6.02 | 6.02 | 6.02 | 6.02 | 6.02 | 6.02 |
| pH Treated Meat | 5.99 | 6.05 | 6.99 | 7.72 | 8.22 | 9.59 | 7.47 | 8.65 | 10.04 | 6.08 | 10 | 11.77 | 8.65 |
| pH After Cooking | 6.31 | 6.27 | 6.9 | 7.25 | 7.7 | 8.77 | 7.26 | 8.86 | 9.34 | 6.17 | 8.91 | 10.41 | 8.58 |

TABLE 1C

Weight and Moisture Retention Results

| | Control 1 | Control 2 | A1 | B1 | A2 | B2 |
|---|---|---|---|---|---|---|
| Pre-Cook 1 | 400.00 | 400.00 | 400.00 | 400.00 | 400.00 | 400.00 |
| Pre-Cook 2 | 400.00 | 400.00 | 400.00 | 400.00 | 400.00 | 400.00 |
| Pre-Cook 3 | 400.00 | 400.00 | 400.00 | 400.00 | 400.00 | 400.00 |
| Pre-Cook 4 | 400.00 | 400.00 | 400.00 | 400.00 | 400.00 | 400.00 |
| After Cook 1 | 242.90 | 247.19 | 336.11 | 344.48 | 355.17 | 359.69 |
| After Cook 2 | 263.40 | 250.33 | 340.53 | 339.87 | 355.09 | 365.11 |
| After Cook 3 | 268.44 | 248.30 | 337.53 | 343.62 | 353.58 | 365.48 |
| After Cook 4 | | 255.43 | 333.01 | 341.46 | 355.84 | 362.39 |
| Wt. Loss 1 | −39.28% | −38.20% | −15.97% | −13.88% | −11.21% | −10.08% |
| Wt. Loss 2 | −34.15% | −37.42% | −14.87% | −15.03% | −11.23% | −8.72% |
| Wt. Loss 3 | −32.89% | −37.93% | −15.62% | −14.10% | −11.61% | −8.63% |
| Wt. Loss 4 | | −36.14% | −16.75% | −14.64% | −11.04% | −9.40% |
| Average Wt. Loss | −35.44% | −37.85% | −15.49% | −14.34% | −11.35% | −9.14% |

| | C2 | A3 | B3 | Control 3 | A4 | B4 | C4 |
|---|---|---|---|---|---|---|---|
| Pre-Cook 1 | 400.00 | 400.00 | 400.00 | 400.00 | 400.00 | 400.00 | 400.00 |
| Pre-Cook 2 | 400.00 | 400.00 | 400.00 | 400.00 | 400.00 | 400.00 | 400.00 |
| Pre-Cook 3 | 400.00 | 400.00 | 400.00 | 400.00 | 400.00 | 400.00 | 400.00 |
| Pre-Cook 4 | 400.00 | 400.00 | 400.00 | 400.00 | 400.00 | 400.00 | 400.00 |
| After Cook 1 | 351.44 | 376.73 | 351.94 | 260.50 | 383.67 | N/A | 374.68 |
| After Cook 2 | 349.05 | 378.65 | 348.33 | 260.51 | 381.27 | N/A | 374.65 |
| After Cook 3 | 350.47 | 379.29 | 353.26 | 258.72 | 381.84 | N/A | 372.57 |
| After Cook 4 | 350.37 | 377.28 | 352.69 | 263.96 | 383.18 | N/A | 371.84 |
| Wt. Loss 1 | −12.14% | −5.82% | −12.02% | −34.88% | −4.08% | N/A | −6.33% |
| Wt. Loss 2 | −12.74% | −5.34% | −12.92% | −34.87% | −4.68% | N/A | −6.34% |
| Wt. Loss 3 | −12.38% | −5.18% | −11.69% | −35.32% | −4.54% | N/A | −6.86% |
| Wt. Loss 4 | −12.41% | −5.68% | −11.83% | −34.01% | −4.21% | N/A | −7.04% |
| Average Wt. Loss | −12.42% | −5.44% | −12.21% | −35.02% | −4.44% | N/A | −6.51% |

TABLE 1D

| Color Measurement Results | | | | | | | | | | | | | |
|---|---|---|---|---|---|---|---|---|---|---|---|---|---|
| | Control 1 | Control 2 | Control 3 | A1 | B1 | A2 | B2 | C2 | A3 | B3 | A4 | B4 | C4 |
| L1 | 72.31 | 79.68 | 80.08 | 76.37 | 77.21 | 75.23 | 72.12 | 74.17 | 75.42 | 66.48 | 71.71 | 52.01 | 76.23 |
| L2 | 71.04 | 79.73 | 78.93 | 76.64 | 76.78 | 76.35 | 71.06 | 74.32 | 74.28 | 65.52 | 71.52 | 51.63 | 74.72 |
| L3 | 72.72 | 75.66 | 79.99 | 74.70 | 76.36 | 75.67 | 72.92 | 75.36 | 75.98 | 63.99 | 71.13 | 58.42 | 77.11 |
| L4 | 71.86 | 79.80 | 79.61 | 76.25 | 78.36 | 76.51 | 71.67 | 74.35 | 73.57 | 65.513 | 72.61 | 53.58 | 76.63 |
| Average L Value | 71.98 | 78.72 | 79.65 | 75.99 | 77.18 | 75.94 | 71.94 | 74.55 | 74.81 | 65.38 | 71.74 | 53.91 | 76.17 |
| A1 | 4.74 | 4.51 | 2.93 | 3.41 | 3.48 | 1.65 | 3.95 | 3.33 | 0.26 | 0.31 | 1.44 | 2.34 | 1.62 |
| A2 | 5.49 | 4.45 | 2.62 | 2.64 | 3.44 | 2.68 | 5.48 | 3.44 | 0.27 | 1.01 | 0.38 | 1.33 | 2.41 |
| A3 | 4.51 | 4.04 | 2.46 | 3.21 | 3.86 | 2.64 | 4.04 | 2.78 | 0.60 | 0.05 | 0.14 | 2.18 | 1.63 |
| A4 | 4.42 | 3.90 | 2.72 | 1.73 | 3.23 | 2.82 | 3.87 | 3.21 | 0.52 | 0.23 | 0.76 | 2.35 | 1.37 |
| Average A Value | 4.79 | 4.23 | 2.68 | 2.75 | 3.50 | 2.45 | 4.34 | 3.19 | 0.41 | 0.40 | 0.68 | 2.05 | 1.76 |
| B1 | 11.47 | 10.10 | 10.68 | 7.86 | 7.92 | 8.71 | 4.25 | 9.43 | 7.49 | 6.82 | 8.13 | 2.85 | 9.51 |
| B2 | 13.25 | 11.72 | 12.72 | 7.91 | 7.16 | 6.87 | 6.09 | 10.00 | 8.50 | 5.66 | 5.78 | 4.10 | 9.33 |
| B3 | 11.54 | 10.04 | 10.43 | 8.22 | 8.33 | 7.61 | 7.68 | 8.02 | 7.84 | 7.08 | 6.30 | 6.54 | 9.13 |
| B4 | 11.46 | 9.74 | 12.19 | 8.29 | 8.28 | 7.51 | 5.18 | 8.91 | 7.14 | 5.69 | 6.81 | 1.92 | 8.60 |
| Average B Value | 11.93 | 10.40 | 11.51 | 8.07 | 7.92 | 7.68 | 5.80 | 9.09 | 7.74 | 6.31 | 6.76 | 3.85 | 9.14 |

It can be seen from Table 1C that the controls, e.g. Controls 1, 2, and 3 had significantly higher weight loss or lower cooking yields than the food products treated with sodium metasilicate, i.e., samples A1–A4. Of course, the higher the weight loss correlates to less moisture retention. Accordingly the sodium metasilicate treated samples had better moisture retention than products that were not treated with anything. Also the L values for the sodium metasilicate treated products were lower than the controls. The controls had more off an off-white color, while the sodium metasilicate treated products exhibited a color towards light brown.

It can also be seen, that at equivalent concentrations, SMS treated products had better moisture retention than sodium carbonate treated products. For example, SMS treated products, A2 and A4 respectively, had a lower weight loss at concentrations of 0.4% w/w and 0.8% w/w respectively, than sodium carbonate treated products, C2 and C4 respectively.

There was no direct correlation observed between pH and yield. Particularly, there was no data to support the general idea that higher pH solutions necessarily provide higher yields. Although the NaOH solutions had a higher pH than the SMS solution, the SMS treated products exhibited better yield results at higher concentrations of treatment solutions. For example, at a concentration of 0.6% w/w, the SMS treated products (A3) had lower weight loss than NaOH treated products (B3).

Example II

This example was performed to demonstrate mixed meat preparation, for example, hot dog preparation. As such, pork meat, beef meat, and neck fat pork meat were each ground separately through a 3 mm plate and cooled at about 2° C. Dry ingredients ground with the meat included ascorbic acid, dextrose, wienerli spices, and a treatment composition of nitrite curing salt (NCS) and sodium metasilicate. Treatment compositions were prepared for sodium metasilicate at ratio 1 (e.g., wherein m is 1 and M is sodium) to achieve concentrations of 0.20, 0.35, and 0.5% w/w (D1, D2, and D3 respectively, as referenced below) of sodium metasilicate in the treated meat. Treatment compositions were also prepared using sodium metasilicate at ratio 3.5 (e.g., wherein m=3.5 and M is sodium) having an SMS concentration of 0.20% w/w (referenced as E1 below) in the treated meat. Control 4 had a treatment composition of only nitrite curing salt without any additional active ingredients, i.e., no phosphates or alkali silicates. Control 5 was prepared using a food grade phosphate mix, commercially available through Rhodia Inc., sold under the trade name Puromix® S1. Puromix® S1 contains sodium tripolyphosphate (STPP). The treatment composition included Puromix®S1 and NCS. The concentration of Puromix®S1 was at 35% w/w. The recipes are shown in Table 2A below.

The meat and dry ingredients were placed in a Stephan cutter, ⅓ of the ice/water was added, and they were mixed for 15 seconds at 600 U/min and 15 seconds at 1500 U/min. Next another ⅓ of the ice/water and the treatment compositions were added and mixed for 15 seconds at 600 U/min and for 15 seconds at 1500 U/min. The neck fat pork was then added with the rest of the water and mixed for 15 seconds at 600 U/min and 15 seconds at 1500 U/min. The bowl was then scraped and a vacuum was applied at about 80%. Then the mixture was mixed again for 15 seconds at 600 U/min and for 15 seconds at 1500 U/min until 12° C. was achieved at 3000 U/min. The temperature of the treated meat at the end of the process was about 12.5° C. The pH of the treated ground meat was measured, and the results are shown in Table 2B below. The treated meat was stuffed into four plastic cups and then sealed with plastic foil. The treated packaged meat was cooked for about 1 hour at 75° C. in a steamer. The packaged meat was cooled for about 1 hour using cold water. The cooked meat was then weighed after it was dried in absorbent paper. The weight loss or yield is shown in Table 2B below.

TABLE 2A

| Recipe | | | | | | |
|---|---|---|---|---|---|---|
| | Control 4 | Control 5 | D1 | D2 | D3 | E1 |
| NCS | 1.80% | 1.80% | 1.80% | 1.80% | 1.80% | 1.8% |
| Spices | 0.40% | 0.40% | 0.40% | 0.40% | 0.40% | 0.40% |
| Ascorbic Acid | 0.05% | 0.05% | 0.05% | 0.05% | 0.05% | 0.05% |
| Dextrose | 1.00% | 1.00% | 1.00% | 1.00% | 1.00% | 1.0% |
| Puromix ® S1 | | 0.35% | | | | |

TABLE 2A-continued

| | Recipe | | | | | |
|---|---|---|---|---|---|---|
| | Control 4 | Control 5 | D1 | D2 | D3 | E1 |
| SMS (m = 1) | | | 0.20% | 0.35% | 0.50% | |
| SMS (m = 3.5) | | | | | | 0.20% |

TABLE 2B

| | Weight and Moisture Retention | | | | | |
|---|---|---|---|---|---|---|
| | Control 4 | Control 5 | D1 | D2 | D3 | E1 |
| pH Meat Mix | 5.94 | 6.18 | 7.94 | 9.15 | 9.71 | 7.47 |
| Weight Before Cooking 1 | 225.05 | 225.06 | 225.03 | 225.00 | 225.06 | 225.08 |
| Weight Before Cooking 2 | 225.11 | 225.08 | 224.96 | 224.96 | 224.91 | 225.06 |
| Weight Before Cooking 3 | 225.04 | 225.02 | 225.04 | 225.03 | 224.94 | 224.98 |
| Weight Before Cooking 4 | 225.09 | 225.03 | 225.01 | 225.01 | 225.01 | 225.01 |
| Weight After Cooking 1 | 177.75 | 186.82 | 177.32 | 170.08 | 167.81 | 176.50 |
| Weight After Cooking 2 | 182.72 | 187.56 | 167.63 | 172.60 | 170.73 | 172.47 |
| Weight After Cooking 3 | 182.38 | 187.81 | 178.82 | 163.88 | 165.00 | 165.31 |
| Weight After Cooking 4 | 179.64 | 186.21 | 173.69 | 172.23 | 167.50 | 166.70 |
| % Wt. Loss 1 | −21.02% | −16.99% | −21.20% | −24.41% | −25.44% | −21.58% |
| % Wt. Loss 2 | −18.83% | −16.67% | −25.48% | −23.28% | −24.09% | −23.37% |
| % Wt. Loss 3 | −18.96% | −16.54% | −20.54% | −27.17% | −26.65% | −26.52% |
| % Wt. Loss 4 | −20.19% | −17.25% | −22.81% | −23.46% | −25.56% | −25.91% |
| Avg. Cooking Loss | −19.75% | −16.86% | −22.51% | −24.58% | −25.43% | −24.35% |
| Stdv* | 0.010 | 0.003 | 0.022 | 0.018 | 0.010 | 0.023 |

*Stdv = Standard Deviation

It should be noted that the high shear forces of the Stephan Cutter may have adversely impacted the performance of the SMS. Nevertheless, the example further demonstrates that there is no direct correlation between pH and cooking yield. For example, it can be seen that lower concentrations of sodium metasilicate, which have a lower pH in the treated meat mixture provide better yield, i.e., lower cooking loss than the higher concentrations of sodium metasilicate, which had a higher pH in the treated meat mixture. Furthermore, the lower pH control Puromix® S1 treated meat mixture (Control 5) had a lower pH than the other treated meat mixtures, yet provided the highest yield. It is believed that the Puromix® S1 (STPP) may be better suited to withstand the high shear forces of the Stephan Cutter, which contributed to its performance in this particular example. However, it should be noted that the other STPP controls in the examples below, did not perform as well as SMS under other contacting or mixing conditions.

Example III

The connective tissue was removed from pork ham meat. The pork ham meat was ground using a ⅜ inch plate. The pH of the raw meat was then measured. The temperature of the meat was 3.3° C. (38° F.). Next, aqueous treatment solutions were prepared of anhydrous sodium metasilicate (SMS) having a ratio of 1 (e.g., wherein m is 1 and M is sodium). The treatment solutions were prepared using salt, water, preservatives (sodium erythorbate and sodium nitrite) and the above listed components to yield concentrations of 0.2, 0.35, and 0.50% w/w sodium metasilicate (F1, F2, and F3 respectively, as referenced below) in the meat. Control 6 was prepared using a treatment solution of preservatives, water, and salt, only, i.e., no additional active ingredients such as phosphate or alkali silicates. Control 7 was prepared using a treatment solution of preservatives, water, salt, and Curafos® STP. Curafos® STP is a commercially available food grade sodium tripolyphosphate (STPP) sold by Rhodia Inc. Sodium tripolyphosphate, is of the general formula $Na_5P_3O_{10}$. The concentration of Curafos was 0.35% w/w. Table 3A below shows the recipe for the various treatment solutions. The pH of each solution was measured and is shown in Table 3A below.

4.500 kg of ground pork meat was placed in a tumbler barrel. 50% of the solution (2.250 kg) was added to the barrel. The barrel was vacuum sealed and the meat was massaged or tumbled for about 4 hours at 12 rpm continuously with a vacuum of about 80%. The barrel was stored over night at a temperature of from about 2° C. to about 4° C. (36° F. to about 39° F.). The meat was then placed into ham-casings and four (4) aluminum loaf pans The meat in the ham casings were then cooked in a water bath for four (4) hours at 79.4° C. (175° F.) up to a core temperature of about 71.1° C. (160° F.). The meat in the aluminum loaf pans ware cooked in a baking oven for about two (2) hours at 110° C. (230° F.) up to a core temperature of about 71.1° C. (160° F.). The weight was standardized at 4.500 kg per sample.

Various measurements were taken before and after cooking. These measurements and results include pH—pH of the solution, pH of the meat before treatment, pH of the meat after treatment and a final pH of the cooked treated meat (see Table 3B); weight for two casing samples (casing A and casing B)—weight of meat before and after cooking, cooking loss, average cooking loss, standard deviation of the average, cooking yield of products cooked in the casings, cooking yield of products cooked in the loaf pans (see Table 3C); and syneresis (see Table 3D). Syneresis is measured after the meat is stored for 24 hours in a refrigerator. At which time the meat is un-packed, dried with absorbent paper and reweighed ($W_2$). Syneresis is defined as $(W_2 \times 100)/W_1$, wherein W1 is the weight of the meat prior to storage. The tables for all of the results and measurements follow.

TABLE 3A

Recipe

| | Control 6 | Control 7 | F1 | F2 | F3 |
|---|---|---|---|---|---|
| Water | 90.81 | 89.76 | 90.21 | 89.76 | 89.31 |
| Salt | 6.00 | 6.00 | 6.00 | 6.00 | 6.00 |
| Dextrose | 3.00 | 3.00 | 3.00 | 3.00 | 3.00 |
| Sodium Erythorbate | 0.15 | 0.15 | 0.15 | 0.15 | 0.15 |
| Sodium Nitrite | 0.05 | 0.05 | 0.05 | 0.05 | 0.05 |
| Curafos ® STP | | 1.05 | | | |
| SMS | | | 0.60 | 1.05 | 1.50 |

TABLE 3B pH Results

| | Control 6 | Control 7 | F1 | F2 | F3 |
|---|---|---|---|---|---|
| pH Solution | 8.34 | 8.04 | 11.43 | 11.78 | 12.04 |
| pH Fresh Meat | 5.79 | 5.79 | 5.79 | 5.79 | 5.79 |
| pH After Tumbling | 5.61 | 5.86 | 6.33 | 6.97 | 7.46 |
| pH Cooked | 5.99 | 6.07 | 6.51 | 7.04 | 7.37 |

TABLE 3C

Weight and Moisture Retention

| | Control 6 | Control 7 | F1 | F2 | F3 |
|---|---|---|---|---|---|
| Weight Fresh Meat | 4500.00 | 4500.00 | 4500.00 | 4500.00 | 4500.00 |
| Solution Added | 2250.00 | 2250.00 | 2250.00 | 2250.00 | 2250.00 |
| Total Weight With Solution | 6750.00 | 6750.00 | 6750.00 | 6750.00 | 6750.00 |
| Weight Casing A White | 2658.90 | 2645.40 | 2678.80 | 2673.20 | 2679.00 |
| Weight Casing B White | 2611.10 | 2666.20 | 2671.70 | 2598.30 | 2683.30 |
| Total Weight Before Cooking | 5270.00 | 5311.60 | 5350.50 | 5271.50 | 5362.30 |
| Weight After Cooking A | 2206.200 | 2606.700 | 2551.200 | 2635.200 | 2649.300 |
| Weight After Cooking B | 2187.700 | 2612.600 | 2515.800 | 2563.800 | 2652.700 |
| Cooking | 4393.900 | 5219.300 | 5067.000 | 5199.000 | 5302.000 |
| Cooking Loss A | 17.03 | 1.46 | 4.76 | 1.42 | 1.11 |
| Cooking Loss B | 16.22 | 2.01 | 5.84 | 1.33 | 1.14 |
| Average Cooking Loss | 16.62 | 1.74 | 5.30 | 1.37 | 1.12 |
| Standard Deviation | 0.57 | 0.39 | 0.76 | 0.07 | 0.02 |
| Yield (Cook-in Bags) | 133.40 | 148.30 | 144.70 | 148.60 | 148.90 |

TABLE 3C-continued

Weight and Moisture Retention

| | Control 6 | Control 7 | F1 | F2 | F3 |
|---|---|---|---|---|---|
| Yield (Open Cooked loaf pans) | 128.90 | 141.60 | 142.20 | 143.20 | 143.90 |

TABLE 3D

Syneresis

| | Control 6 | Control 7 | F1 | F2 | F3 |
|---|---|---|---|---|---|
| Weight Before Storage Sliced | 374.15 | 491.60 | 501.50 | 507.60 | 486.80 |
| Weight After Storage Sliced | 371.90 | 480.40 | 492.20 | 506.80 | 483.10 |
| Syneresis Sliced | 0.60 | 2.28 | 1.85 | 0.16 | 0.76 |

It can be readily observed that the sodium metasilicate treated products had much lower cooking loss in comparison to the untreated products (Control 6). Accordingly the cook yield was also higher for the SMS treated products in comparison to the untreated products. As can also be seen from the data above, sodium metasilicate treated products showed results comparable to, if not better than, the cooking yield of the phosphate treated products (control 7). Furthermore, at equivalent concentrations of 0.35%, the sodium metasilicate treated product (F2) had a lower cooking loss and slightly higher cook yield than the phosphate treated product (Control 7). Syneresis was also lower for the SMS treated samples in comparison to the phosphate treated samples (Control 7).

Example IV

Fifteen (15) fresh boneless chicken breasts of similar size and weight were used for this example. The temperature of the meat was about 2.2° C. (36° F.). Aqueous treatment solutions were prepared of anhydrous sodium metasilicate (SMS) having a ratio of 1 (e.g., wherein m is 1 and M is sodium). The treatment solutions were prepared using salt, water, and the above listed components to yield concentrations of 0.2, 0.35, and 0.50% w/w sodium metasilicate (G1, G2, and G3 respectively, as referenced below) in the meat. Control 8 was prepared using a treatment solution of water and salt, only, i.e., no additional active ingredients such as phosphate or alkali silicates were added. Control 7 was prepared using a treatment solution of water, salt, and Curafos® STP. The concentration of Curafos® STP was 0.35% w/w. Table 4A below shows the recipe for the various treatment solutions. The pH of each solution was measured and is shown in Table 4B below.

The meat was placed in a tumbler barrel. The solution, equal to 15% of the weight of the meat, was added to the barrel. The barrel was vacuum sealed and the meat was massaged or tumbled for about one (1) hour at 12 rpm continuously with a vacuum of about 80% at a temperature of 4.4° C. (40° F.). The meat was then cooked by baking in an oven at 204.4° C. (400° F.) for about 20 minutes until the core temperature was about 71.1° C. (160° F.). About one hour after cooking, the meat was drained then weighed. The meat was then cooled for 24 hours at 3.3° C. (38° F.).

Various measurements were taken before and after cooking for 14 of the 15 chicken breasts. Accordingly the results are reported based on an average of 14 chicken breasts. The measurements and results include pH—pH of the solution, pH of the meat before treatment, pH of the meat after treatment and a final pH of the cooked treated meat surface (see Table 4B); and average pick-up after tumbling, referring to the amount of treatment solution actually absorbed on the chicken breast (see Table 4C): average yield after cooking (see Table 4C); and appearance (see Table 4D).

TABLE 4A

| | Control 8 | Cantrol 9 | G1 | G2 | G3 |
|---|---|---|---|---|---|
| Water | 94.25 | 91.57 | 92.72 | 91.57 | 90.42 |
| Salt | 5.75 | 5.75 | 5.75 | 5.75 | 5.75 |
| Curafos ® | | 2.68 | | | |
| SMS | | | 1.53 | 2.68 | 3.83 |

TABLE 4B

| | Control 8 | Control 9 | G1 | G2 | G3 |
|---|---|---|---|---|---|
| pH Solution | 6.49 | 8.16 | 12.61 | 12.81 | 12.93 |
| pH Fresh Meat | 6.05 | 6.05 | 6.05 | 6.05 | 6.05 |
| pH After Tumbling | 5.72 | 6.06 | 7.07 | 8.09 | 8.29 |
| pH After Cooking (Surface) | 6.03 | 6.02 | 6.03 | 6.35 | 6.44 |

TABLE 4C

| | Control 8 | Control 9 | G1 | G2 | G3 |
|---|---|---|---|---|---|
| Average Pick Up After Tumbling | 113.57 | 113.02 | 113.99 | 113.98 | 113.87 |
| Standard Deviation | 2.23 | 2.41 | 3.30 | 3.79 | 4.98 |
| Yield After Cooking | 79.19 | 86.85 | 93.21 | 95.16 | 96.13 |
| Standard Deviation | 1.25 | 1.79 | 4.02 | 4.01 | 5.33 |

It can be shown that the sodium metasilicate treated products had higher cooking yields than both controls. It can also be seen that the cooking yield for the sodium metasilicate treated product at a concentration of 0.35% (G2) was higher than the phosphate treated product at the same concentration (Control 9).

The invention claimed is:

1. An animal protein-containing food product, comprising uncooked animal protein, water and an amount of an alkali silicate effective to enhance the moisture retention of the food product, wherein said amount of said alkali silicate is greater than or equal to about 0.1% w/w alkali silicate concentration in said animal protein-containing food product.

2. The product of claim 1, wherein said alkali silicate comprises one or more crystalline or amorphous alkali silicate compounds according to the formula:

$$M_2O.m(SiO_2).nH_2O$$

wherein:

M is sodium or potassium, m is a number, wherein $0.5 \leqq m \leqq 4$, indicating the number of mole(s) of the $SiO_2$ moiety per 1 mole of $M_2O$ moiety; and n indicates the water content, expressed as percent by weight (wt %) water, wherein $0\% \leqq n \leqq 55\%$.

3. The product of claim 2, wherein m=1 and M is sodium.

4. The product of claim 2, wherein m=2 and M is sodium.

5. The product of claim 2, wherein m=3.5 and M is sodium.

6. The product of claim 1, wherein said alkali silicate is sodium metasilicate.

7. The product of claim 6, wherein said sodium metasilicate is anhydrous.

8. The product of claim 1, wherein said alkali silicate comprises one or more metasilicates, which are crystalline products, according to $M_2O.(SiO_2).n'H_2O$, wherein M is sodium (Na) or potassium (K) and n' is 0, 5, 6 or 9 and n' indicates the number of moles of water per $SiO_2$ moiety.

9. The product of claim 1, wherein said alkali silicate comprises one or more of anhydrous sodium metasilicate, anhydrous potassium metasilicate, sodium metasilicate pentahydrate, sodium metasilicate hexahydrate and sodium metasilicate nonahydrate.

10. The product of claim 1, wherein said alkali silicate comprises one or more of anhydrous sodium metasilicate, anhydrous potassium metasilicate and sodium metasilicate pentahydrate.

11. The product of claim 1, wherein said amount of said alkali silicate is about 0.2% w/w to about 1% w/w alkali silicate concentration in said animal protein-containing food product.

12. The product of claim 11, wherein said amount of said alkali silicate is about 0.2% w/w concentration in said animal protein-containing product.

13. The product of claim 1, comprising from about 1% w/w to about 30% w/w muscle protein, from about 30% w/w to about 80% w/w water, up to about 50% w/w fat, and from about 0.1% w/w to about 1.0% w/w of said alkali silicate, based on about 100% w/w of said product.

14. An animal protein-containing food product, comprising animal protein, water and an amount of an alkali silicate effective to enhance the moisture retention of the food product, wherein said alkali silicate comprises one or more of anhydrous sodium metasilicate and anhydrous potassium metasilicate, and one or more of sodium metasilicate pentahydrate and potassium metasilicate pentahydrate.

15. An animal protein-containing food product comprising from about 1% w/w to about 30% w/w uncooked muscle protein, from about 30% w/w to about 80% w/w water, up to about 50% w/w fat, and from about 0.1% w/w to about 1.0% w/w of sodium metasilicate, based on about 100% w/w of said product.

16. An uncooked animal protein-containing food product, comprising an amount of alkali silicate effective to enhance the moisture retention of said food product, wherein said amount of said alkali silicate is greater than or equal to about 0.1% w/w alkali silicate concentration in said uncooked animal protein-containing food product.

17. The product of claim 16, comprising from about 1% w/w to about 30% w/w muscle protein, from about 30% w/w to about 80% w/w water, up to about 50% w/w fat, and from about 0.1% w/w to about 1.0% w/w of said alkali silicate, based on about 100% w/w of said product.

18. The product of claim 16, wherein said amount of said alkali silicate is about 0.2% w/w to about 1% w/w alkali silicate concentration in said animal protein-containing food product.

19. A method for treating an uncooked animal protein-containing food product to improve the moisture retention of the food product, comprising contacting the uncooked food product with an alkali silicate in an amount effective to provide greaterthan or equal to about 0.1% w/w alkali silicate concentration in said animal protein-containing food product.

20. The method of claim 19, wherein the alkali silicate comprises one or more crystalline or amorphous alkali silicate compounds according to the formula:

$$M_2O.m(SiO_2).nH_2O$$

wherein:

M is sodium or potassium, m is a number, wherein 0.5≦m≦4, indicating the number of mole(s) of the $SiO_2$ moiety per 1 mole of $M_2O$ moiety; and n indicates the water content, expressed as percent by weight (wt %) water, wherein 0% ≦n≦55%.

21. The method of claim 19, wherein said alkali silicate is sodium metasilicate.

22. The method of claim 21, wherein said sodium metasilicate is anhydrous.

23. The method of claim 19, wherein the alkali silicate comprises one or more crystalline metasilicates according to $M_2O(SiO_2).n'H_2O$, wherein M is Na or K and n' is 0, 5, 6 or 9 and indicates the number of moles of water per $SiO_2$ moiety.

24. The method of claim 19, wherein the alkali silicate comprises one or more of anhydrous sodium metasilicate, anhydrous potassium metasilicate, sodium metasilicate pentahydrate, sodium metasilicate hexahydrate and sodium metasilicate nonahydrate.

25. The method of claim 19 wherein said alkali silicate is in a dry particulate form.

26. The method of claim 19 wherein said alkali silicate is an aqueous solution.

27. The method of claim 26, wherein said aqueous solution comprises from about 0.2 wt % to about 15 wt % alkali silicate.

28. The method of claim 27, wherein said aqueous solution comprises from about 0.47 wt % to about 6 wt % alkali silicate.

29. The method of claim 19, wherein said food product is contacted with said alkali silicate by mixing said alkali silicate in said food product.

30. The method of claim 19, wherein said food product is contacted with said alkali silicate by tumbling, dipping, immersion, injection, or massage marinating.

31. The method of claim 19, further comprising cooking said food product after said contacting step.

32. A method for treating a food product to retain moisture, comprising the steps of:

providing an uncooked animal muscle tissue containing meat;

treating said meat with an alkali silicate composition to produce alkali silicate treated meat with greater than or equal to about 0.1% w/w alkali silicate concentration; and retaining moisture content in said alkali silicate treated meat above an amount of moisture retained in an animal muscle tissue containing meat having no alkali-silicates therein.

33. The method of claim 32, further comprising cooking said meat after said treating step.

34. The method of claim 32, wherein said alkali silicate composition comprises sodium metasilicate.

35. The method of claim 32, wherein said alkali silicate comprises one or more crystalline or amorphous alkali silicate compounds according to the formula:

$$M_2O.m(SiO_2).nH_2O$$

wherein:

M is sodium or potassium, m is a number, wherein 0.5≦m≦4, indicating the number of mole(s) of the $SiO_2$ moiety per 1 mole of $M_2O$ moiety; and n indicates the water content, expressed as wt % water, wherein 0% ≦n≦55%.

36. The method of claim 32, wherein said alkali silicate comprises one or more crystalline metasilicates according to $M_2O(SiO_2).n'H_2O$, wherein M is Na or K and n' is 0, 5, 6 or 9 and indicates the number of moles of water per $SiO_2$ moiety.

37. The method of claim 32, wherein said alkali silicate is an aqueous solution.

38. The method of claim 37, wherein said aqueous solution comprises from about 0.2 wt % to about 15 wt % alkali silicate.

39. The method of claim 38, wherein said aqueous solution comprises from about 0.47 wt % to about 6 wt % alkali silicate.

40. The method of claim 32, wherein said alkali silicate treated meat has a concentration greater than or equal to about 0.2% w/w to about 1% w/w alkali silicate.

41. Meat comprising uncooked animal muscle tissue protein, water and an amount of an alkali silicate effective to enhance the moisture retention of the meat, wherein said amount of said alkali silicate is greater than or equal to about 0.1% w/w alkali silicate concentration in said meat.

42. The meat of claim 41, wherein said alkali silicate comprises one or more crystalline or amorphous alkali silicate compounds according to the formula:

$$M_2O.m(SiO_2).nH_2O$$

wherein:

M is sodium or potassium, m is a number, wherein 0.5≦m≦4, indicating the number of mole(s) of the $SiO_2$ moiety per 1 mole of $M_2O$ moiety; and n indicates the water content, expressed as wt % water, wherein 0% ≦n≦55%.

43. The meat of claim 41, wherein said alkali silicate comprises one or more metasilicates, which are crystalline products, according to $M_2O.(SiO_2).n'H_2O$, wherein M is sodium (Na) or potassium (K) and n' is 0, 5, 6 or 9 and n' indicates the number of moles of water per $SiO_2$ moiety.

44. The meat of claim 41, comprising from about 1% w/w to about 30% w/w of said animal muscle tissue protein, from about 30% w/w to about 80% w/w water, up to about 50% w/w fat, and from about 0.1% w/w to about 1.0% w/w of said alkali silicate, based on about 100% w/w of said product.

45. The meat of claim 41, wherein said alkali silicate comprises sodium metasilicate.

46. A method for retaining moisture in uncooked meat comprising using an amount of sodium metasilicate to contact said meat, whereby said amount of sodium metasilicate is effective to enhance the moisture retention of said meat and is greater than or equal to about 0.1% w/w alkali silicate concentration in said meat.

47. The method of claim 46, wherein said amount of said sodium metasilicate is effective to provide from about 0.1% w/w to about 1.0% w/w concentration of said sodium metasilicate in said meat.

48. The method of claim 46, further comprising cooking said meat after the meatcontact step.

49. An animal protein-containing food product, comprising animal protein, water and an amount of an alkali silicate effective to enhance the moisture retention of the food product, wherein said amount of said alkali silicate is greater than or equal to about 0.1% w/w alkali silicate concentration in said animal protein-containing food product, wherein said alkali silicate comprises one or more of anhydrous sodium metasilicate and anhydrous potassium metasilicate, and one or more of sodium metasilicate pentahydrate and potassium metasilicate pentahydrate.

* * * * *